Patented Sept. 14, 1948

2,449,098

UNITED STATES PATENT OFFICE 2,449,098

PROCESS FOR MAKING OILS FROM ACID SLUDGES RESULTING FROM THE SULFURIC ACID PURIFICATION OF COAL TAR DISTILLATES

Harry L. Allen and George J. Skriver, Philadelphia, Pa., assignors to Allied Chemical & Dye Corporation, New York, N. Y., a corporation of New York No Drawing. Application September 29, 1945, Serial No. 619,426

5 Claims. (Cl. 196—148)

This invention relates to manufacture of oils, and is directed more particularly to processes for making oils from acid sludges resulting from the sulfuric acid purification of coal tar distillates.

In known operations for refining crude coal tar oils by sulfuric acid treatment, there are produced large quantities of acid sludges which are usually disposed of as waste or sometimes burned as fuel. On account of their high acid and sulfur contents, such sludges are not satisfactory fuels.

We have discovered that these acid sludges contain certain hydrocarbon oils which have been found to be useful in the arts e. g. particularly in rubber compounding and in manufacture of resins.

A principal object of the invention is to provide processes which make possible the recovery of the herein described hydrocarbon oils from acid sludges of the type mentioned. A further object is provision of procedure for recovery of these oils in such a way as to obtain high yields of the sought-for oil products.

In carrying out the invention, the acid sludges which may be employed as starting materials are those derived from sulfuric acid purification of crude coal tar distillate oils such as crude benzol, toluol, crude naphthalene, crude solvent naphtha and crude hi-flash solvent. Although compositions of such sludges vary widely, composition of representative suitable acid sludges are about as follows: 20–60% $H_2SO_4$, 0.1–10% oil and naphthalene, and 3–50% pitch.

According to the invention, the acid sludge utilized is treated with water under conditions to form a mass comprising tarry material herein designated as acid pitch, and aqueous relatively weak sulfuric acid. Preferably, the raw acid sludge is diluted with 15 to 25 parts by weight of water, agitated, and held at temperature of 75° to 102° C. for a period of time ranging from ¼ to ½ an hour, the equipment employed being such as to facilitate maintenance of agitation and the temperature conditions stated. This operation results in separation of the tar from the sludge and the leaching out of most of the sulfuric acid into the water layer. On settling for an interval of 3 to 4 hours, the mass stratifies to an under layer of relatively weak sulfuric acid and an upper layer of solid and semi-liquid acid pitch containing substantial quantity of occluded sulfuric acid. The impure weak sulfuric acid solution, which may have an $H_2SO_4$ concentration of 35 to 45%, and the acid pitch are separated by any suitable means e. g. by drawing off the under layer of weak acid. In this operation, at least most of the weak sulfuric acid is separated from the acid pitch, although after decantation, the acid pitch usually contains an appreciable amount of weak sulfuric acid solution. The described water treatment step effects easy separation and removal from the crude acid sludges of certain water and/or acid soluble materials such as sulfonates which, if not thus removed, would be carried thru the process and be only difficultly separable at a subsequent process stage or alter the character of the final product.

The acid pitch is then treated with a suitable neutralizing agent under conditions to completely neutralize substantially all of the remaining sulfuric acid associated with the acid pitch. Neutralizing agents such as caustic soda, lime, sodium carbonate, calcium carbonate, and magnesia may be used for this purpose. To facilitate operation and procure adequate neutralization of residual sulfuric acid, the neutralizing agent is used preferably in the form of a water solution containing sufficient neutralizing material to completely neutralize residual sulfuric acid present in the acid pitch, the amount of water as such being enough as to form an acid pitch-neutralizing agent mass which is relatively fluid and readily agitatable. Neutralization is preferably carried out in a vessel equipped with an agitator and provided with means to maintain temperatures in the vessel from room temperature to about 105° C., usual neutralizing temperature being about the boiling temperature of the mass formed by addition of the neutralizing solution to the acid pitch. Time required for neutralization may vary from 15 minutes to 5 hours depending upon physical nature of the acid pitch, i. e. whether fairly finely divided or relatively lumpy. Usually, the quantity of water employed amounts to from 1 to 2 parts by weight of the acid pitch, and the quantity of neutralizing agent depends of course upon the $H_2SO_4$ content of the acid pitch, and the alkalinity of the specific neutralizing agent used in the particular operation. End point of the neutralization operation may be determined by any suitable test applied to a representative sample of the mass in the neutralizer.

When the condition of neutralization is attained, the neutralized acid pitch may be separated from the aqueous phase as by filtration or centrifuging. If desired the separated acid pitch may be washed one or more times with water. Preferably, substantially all the aqueous phase is separated from the pitch, although in some instances the acid pitch may contain 10–25% by weight of occluded water.

The neutralized acid pitch is then destructively distilled. In accordance with the invention, we have found certain destructive distillation conditions which result in production of the sought-for product oils of the present improvements.

The neutralized acid sludge is charged into a still which may be either cold or preliminarily heated to moderate temperature, say of the order of 150–175° C. The still is externally heated, i. e. constructed and operated in such a way that there is no direct contact between hot fire gases and the body or batch of acid pitch undergoing distillation. The equipment is designed for distillation at atmospheric pressure and is provided with a vapor offtake connected with the inlet of a suitable condenser. Regardless of particular construction of the still and the mode of heating, the operation is such that at the time of charging the still, vapor temperature of any vapors more or less immediately exiting the distillation zone are about 100–125° C. Firing of the still is controlled so that thereafter temperature in the distillation zone increases, preferably at a relatively smooth gradient, to a point such that vapor temperature of the oil vapors exiting distillation approaches but does not substantially exceed 400° C. We find that at significantly higher vapor temperatures, the oil products of the invention begin to decompose. Distillation of the body of acid pitch is carried out in the distillation zone in the absence of extraneous steam, oxidizing material, or other modifying agent which might alter the characteristic properties of the product oils. This and the distillation of the acid pitch at atmospheric pressure are important features of this invention. We have found vacuum distillation which a chemist would normally use to obtain maximum yield of oil does not form the desired products since it results in (a) less desirable oils containing substantially less low boiling constituents and (b) a less valuable distillation residue of a plastic character difficult to handle as contrasted with the coke-like residue resulting from distillation carried out at atmospheric pressure.

The distillation operation is proceeded with for a period of time such that the distillation zone residue is reduced to a relatively dry, solid, coke-like mass. Distillation time may vary considerably depending principally upon the size of the acid pitch charge, and upon the design of the particular equipment employed.

The vapors discharged from the distillation zone may be condensed in any suitable way. The resulting oily condensate is an oil predominantly aromatic in character and having a boiling range of 75°–400° C. and specific gravity at 25° C. of 0.990–1.000. The oils obtained by the foregoing process have physical and chemical characteristics differing substantially from oils obtained by destructive distillation of sludges or acid pitches derived from sulfuric acid refining of petroleum oils.

About 40% by volume of the total condensate boils at temperature of about 75–225° C., and the remainder at about 225–400° C. The preferred product of the invention is an oil having a boiling point range of 225–400° C. If desired such a product may be fractionated out of the vapors leaving the distillation zone, or the total exit of the distillation zone may be liquefied and the condensate redistilled to recover the preferred 225–400° C. cut which is an unsaturated, dark brown oil having a clean and slightly terpene-like odor, and which has been found to be particularly valuable for use in compounding rubber and in manufacture of resins. Representative samples of this heavy fraction had specific gravity in the range of 0.990–0.996 at 25° C., contained about 14% paraffin type hydrocarbons by the sulfonation test method, and had viscosity of 75 centipoises at 25° C.

We find that by carrying out destructive distillation of acid pitches of the type specified under the particular described conditions of atmospheric pressure, temperature and time, the mass in the distillation zone remains throughout the heating period in a distillable condition, the sought-for oils are not decomposed, and condensate in the condenser does not become viscous but retains a readily flowable condition, and high yields of the order of 30–42% by weight of the acid pitch charged into the still may be obtained.

In the practice of one example of the invention, the acid sludge used was that resulting from a commercial operation in which 66° Bé. sulfuric acid was used for purification of crude benzol-toluol from drip oil, and the approximate composition of acid sludge was by weight 29% $H_2SO_4$, 9% oil and naphthalene, and 47% pitch. A quantity of this acid sludge was diluted with about 20% by weight of water, agitated, and boiled for about 15 minutes. After settling for about 3 hours, the under layer of weak sulfuric acid, having an $H_2SO_4$ concentration of about 40%, was drawn off.

1000 parts by weight of the acid pitch were mixed with 2130 parts by weight of an aqueous solution having an NaOH concentration of about 11%. The mass was agitated at temperature of about 25° C. for about 1 hour. The mass was settled and the supernatant aqueous phase was drawn off.

The neutralized acid pitch was charged into a cold still adapted to be externally heated. Heating was controlled so that temperature in the still was raised, by a relatively smooth gradient, to a point such that maximum vapor temperature of vapors exiting the still was about 395° C. Distillation was carried out at atmospheric pressure, and until the residue in the still was reduced to a relatively dry, solid coke-like mass. Distillation time was 3 hours. The vapors exiting the distillation zone were condensed in a simple total condenser, and during the entire operation, the distillate in the condenser remained completely fluid. There were recovered 315 parts by weight of oil having a boiling point range of 78–394° C., yield amounting to 31.5% on the basis of the acid pitch mass charged into the still.

Use of the herein described oils in the manufacture of resins is claimed in Allen and Kerr U. S. application Serial No. 619,425, filed September 29, 1945, and use of such oils in the compounding of rubber is claimed in Cole U. S. application Serial No. 659,430, filed April 3, 1946.

We claim:

1. The method for making an oil which comprises treating acid sludge, resulting from the sulfuric acid purification of coal tar distillate, with water under conditions to form a mass comprising acid pitch and aqueous relatively weak sulfuric acid, separating the acid pitch from at least most of the weak sulfuric acid, treating the acid pitch with neutralizing agent under conditions to substantially completely neutralize remaining sulfuric acid associated with the acid pitch, separating from the acid pitch substantially all of any residual aqueous phase resulting from said neutralization operation, subjecting the neutralized acid pitch to destructive distillation at atmospheric pressure by gradual external heating and at temperature such that vapor temperature of the oil vapors exiting the distillation zone does not substantially exceed 400° C. and for a period of time such that the distillation zone residue is reduced to a relatively solid coke-like mass, condensing the oil vapors exiting the distillation zone and recovering an oil fraction boiling within the range of substantially 75–400° C.

2. The method for making an oil which comprises treating acid sludge, resulting from the sulfuric acid purification of coal tar distillate, with water under conditions to form a mass comprising acid pitch and aqueous relatively weak sulfuric acid, separating the acid pitch from at least most of the weak sulfuric acid, treating the acid pitch with neutralizing agent under conditions to substantially completely neutralize remaining sulfuric acid associated with the acid pitch, separating from the acid pitch substantially all of any residual aqueous phase resulting from said neutralization operation, subjecting the neutralized acid pitch to destructive distillation at atmospheric pressure by gradual external heating and at temperature such that vapor temperature of the oil vapors exiting the distillation zone does not substantially exceed 400° C. and for a period of time such that the distillation zone residue is reduced to a relatively solid coke-like mass, condensing the oil vapors exiting the distillation zone, and recovering an oil fraction having a boiling point range of substantially 225–400° C.

3. The method for making an oil which comprises treating acid sludge, resulting from the sulfuric acid purification of coal tar distillate, with water at elevated temperature under conditions to form a mass comprising acid pitch and aqueous relatively weak sulfuric acid, separating the acid pitch from at least most of the weak sulfuric acid, treating the acid pitch with an aqueous solution of neutralizing agent at about the boiling temperature of resulting mass for a period of time sufficient to substantially completely neutralize remaining sulfuric acid associated with the acid pitch, separating from the acid pitch substantially all of the residual aqueous phase resulting from said neutralization operation, subjecting the neutralized acid pitch to destructive distillation at atmospheric pressure by gradual external heating and at temperature such that vapor temperature of the oil vapors exiting the distillation zone does not substantially exceed 400° C. and for a period of time such that the distillation zone residue is reduced to a relatively solid coke-like mass, condensing the oil vapors exiting the distillation zone and recovering an oil fraction boiling within the range of substantially 75–400° C.

4. The method for making an oil which comprises treating acid sludge, resulting from the sulfuric acid purification of coal tar distillate, with water at elevated temperature under conditions to form a mass comprising acid pitch and aqueous relatively weak sulfuric acid, separating the acid pitch from at least most of the weak sulfuric acid, treating the acid pitch with an aqueous solution of neutralizing agent at about the boiling temperature of the resulting mass for a period of time sufficient to substantially completely neutralize remaining sulfuric acid associated with the acid pitch, separating from the acid pitch substantially all of the residual aqueous phase resulting from said neutralization operation, subjecting the neutralized acid pitch to destructive distillation at atmospheric pressure by gradual external heating and at temperature such that vapor temperature of the oil vapors exiting the distillation zone does not substantially exceed 400° C. and for a period of time such that the distillation zone residue is reduced to a relatively solid coke-like mass, condensing the oil vapors exiting the distillation zone, and recovering an oil fraction having a boiling point range of substantially 225–400° C.

5. The method for making an oil which comprises subjecting to destructive distillation, substantially completely neutralized acid pitch derived from acid sludge resulting from the sulfuric acid purification of coal tar distillate, said distillation operation being carried out at atmospheric pressure and by gradual external heating at temperature such that vapor temperature of the oil vapors exiting the distillation zone does not substantially exceed 400° C. and for a period of time such that the distillation zone residue is reduced to a relatively solid coke-like mass, condensing the oil vapors exiting the distillation zone and recovering an oil fraction boiling within the range of substantially 75–400° C.

HARRY L. ALLEN.
GEORGE J. SKRIVER.

REFERENCES CITED

The following references are of record in the file of this patent:

UNITED STATES PATENTS

| Number | Name | Date |
|---|---|---|
| 2,026,456 | Bradley | Dec. 31, 1935 |
| 2,141,297 | Harrington | Dec. 27, 1938 |
| 2,185,952 | Rostler et al. | Jan. 2, 1940 |
| 2,370,277 | Wethly | Feb. 27, 1945 |
| 2,404,608 | Wells et al. | July 23, 1946 |

FOREIGN PATENTS

| Number | Country | Date |
|---|---|---|
| 460,973 | Great Britain | Feb. 8, 1937 |
| 657,171 | Germany | Feb. 26, 1938 |